(12) United States Patent
Wada

(10) Patent No.: US 8,902,410 B2
(45) Date of Patent: Dec. 2, 2014

(54) OPTICAL RANGING DEVICE AND ELECTRONIC EQUIPMENT INSTALLED WITH THE SAME

(71) Applicant: Hideo Wada, Osaka (JP)

(72) Inventor: Hideo Wada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 105 days.

(21) Appl. No.: 13/667,415

(22) Filed: Nov. 2, 2012

(65) Prior Publication Data
US 2013/0135605 A1    May 30, 2013

(30) Foreign Application Priority Data
Nov. 28, 2011  (JP) .................. 2011-258977

(51) Int. Cl.
G01C 3/08    (2006.01)

(52) U.S. Cl.
USPC ......... 356/5.01; 356/3.01; 356/3.1; 356/4.01; 356/4.1

(58) Field of Classification Search
CPC ............ G01C 3/05; G01C 3/085; G01C 3/00; G01C 3/10
USPC ............. 356/3.01–3.15, 4.01–4.1, 5.01–5.15, 356/6–22
See application file for complete search history.

(56) References Cited

U.S. PATENT DOCUMENTS

| | | | |
|---|---|---|---|
| 4,313,654 A | 2/1982 | Matsui et al. | |
| 5,179,287 A | 1/1993 | Kitajima et al. | |
| 6,972,834 B1 | 12/2005 | Oka et al. | |
| 2003/0123044 A1* | 7/2003 | Oka | 356/3.02 |
| 2003/0184725 A1 | 10/2003 | Takaoka et al. | |
| 2011/0170086 A1 | 7/2011 | Oouchida | |
| 2011/0194097 A1* | 8/2011 | Yamaguchi et al. | 356/4.01 |

FOREIGN PATENT DOCUMENTS

| | | |
|---|---|---|
| DE | 102 32 160 A1 | 7/2003 |
| JP | 4-174923 | 6/1992 |
| JP | 07-098205 A | 4/1995 |
| JP | 2011-145115 A | 7/2011 |
| JP | 2008-157718 A | 7/2013 |

* cited by examiner

Primary Examiner — Luke Ratcliffe
(74) Attorney, Agent, or Firm — Birch, Stewart, Kolasch & Birch, LLP

(57) ABSTRACT

An optical ranging device has a light emitting element, a light receiving element, a light emitting lens, and a light receiving lens. Provided between the light receiving lens and the light receiving element are a first reflection surface and a second reflection surface for changing a direction of an optical axis of a light beam condensed by the light receiving lens and guiding the light beam to the light receiving element. A single medium exists between the first reflection surface and the second reflection surface.

14 Claims, 5 Drawing Sheets

OPTICAL RANGING DEVICE AND ELECTRONIC EQUIPMENT INSTALLED WITH THE SAME

TECHNICAL FIELD

The present invention relates to an optical ranging device for optically detecting a distance to an object, and electronic equipment installed with the same and particularly, to a small optical ranging device capable of detecting a long distance with high precision and electronic equipment installed with the same.

BACKGROUND ART

A large number of ranging devices have been proposed that project spot light onto an object for measurement, that receive the resultant reflected light, and that measure a distance to the object for measurement by trigonometrical ranging, as shown in FIG. 5. In the ranging device, as shown in FIG. 5, given that a center of a light emitting lens 2 is an origin O(0, 0), an axis of emitted light is y axis, and an axis orthogonal to the axis 5 of emitted light at the origin O is x axis, a light beam emitted from a light emitting element 1 placed on a point A(0, −d) is made into a generally parallel light beam by the light emitting lens 2 placed on the origin O, which beam projects a light spot on a point B(0, y) on an object 3 for measurement. The light beam reflected by the object 3 for measurement is condensed by a light receiving lens 4 placed on a point C(L, 0), is imaged on a point D(L+1, −d) on a position detecting element (e.g., PSD: Position Sensitive Detector) 6 placed on a line extending from the point A in a direction of the x axis, and thereby forms a received light spot.

On condition that a point at which a line passing through the point C, i.e., the center of the light receiving lens 4, and being parallel to the y axis intersects the position detecting element 6 is defined as point E (L, −d), a triangle OBC is homothetic to a triangle ECD. Accordingly, a distance y to the object for measurement 3 can be detected through detection of a position of the received light spot by the position detecting element 6, measurement of a side ED (=l), and calculation of expression (1) below.

$$y = \frac{L \cdot d}{l} \quad (1)$$

This is a general principle of the trigonometrical ranging.

As the position detecting element 6, the PSD, a linear image sensor or an image sensor having a plurality of photodiodes placed thereon, or the like is used for detecting the position of an optical center of gravity of the received light spot projected onto the position detecting element 6.

Providing that the position detecting element 6 has a resolution of detection, $\Delta l$, a resolution $\Delta y$ at the measured distance y can be expressed by equation (2).

$$\Delta y = -\frac{y^2}{L \cdot d} \cdot \Delta l \quad (2)$$

That is, selection of the position detecting element 6 that is to be used involves determination of the resolution $\Delta l$ of detection of the position detecting element 6, and thus the resolution $\Delta y$ at the measurement distance y is determined by a distance L (which will be referred to as a base line length, hereinbelow) between the light emitting lens 2 and the light receiving lens 4 and by a focal length d of the light receiving lens 4. The greater each of them is, the smaller the resolution $\Delta y$ at the measurement distance y is and thus the higher resolution of distance detection is. On condition that a distance to a far object for measurement is measured, in particular, the measurement distance y is increased and thus it is necessary to increase the base line length L or the focal length d in order to reduce the resolution $\Delta y$.

FIG. 6 is a diagram showing a schematic configuration of a conventional optical ranging device. A light emitting element 12 and a light receiving element 13 are mounted in specified positions on a lead frame 11 and are individually sealed with a light permeable resin so that a light emitting side primary molded body 14 and a light receiving side primary molded body 15 are formed. Both the primary molded bodies 14 and 15 are sealed with a light shielding resin so that a secondary molded body 16 is formed. Then a lens holder 19 provided with a light emitting lens 17 and a light receiving lens 18 is fitted on the secondary molded body 16, and the optical ranging device is thereby formed.

Measurement of a distance to a far object for measurement by such an optical ranging device can be attained by increase in the focal length d of the light receiving lens 18, as shown in FIG. 7, or by increase in the base line length L that is a distance between centers of the light emitting lens 17 and the light receiving lens 18, as shown in FIG. 8. Both arrangements, however, cause increase in size of the optical ranging device as a whole and increase in costs thereof, necessitate a relevant space in electronic equipment to install the optical ranging device, and thus make the device difficult to handle or use.

In order to cope with such problems, ranging devices (distance measuring devices) as disclosed in JP H07-98205 A (Patent Literature 1) and JP 2011-145115 A (Patent Literature 2) have been proposed.

In the ranging device of the above-mentioned Patent Literature 1, as shown in FIG. 9, an optical path changing means composed of two pairs of mirrors 24B, 25B, 24R, 25R for changing two optical paths of beams of incident light from an object for distance measurement so as to direct the beams toward a center axis of the device and so as to make the beams pass through a first lens 22B and a second lens 22R, respectively, is provided outside a ranging module 21 including the two light receiving lenses 22B, 22R and two light sensors 23B, 23R. Increase in the base line length B in that way allows precise measurement of distance values.

As shown in FIG. 10, the ranging device of the above-mentioned Patent Literature 2 includes a lens array member 26 having a pair of ranging lenses 26a, 26b, a mirror array member 28 having a pair of reflection members 28a, 28b, and an intermediate mirror member 29. The mirror array member 28 and the intermediate mirror member 29 are provided to reflect image forming beams coming through the ranging lenses 26a, 26b so that an image of an object is formed on each of imaging regions 27a, 27b of an imaging element 27. This arrangement allows measurement of precise distance values by an increase in focal lengths of the lenses and cancellation of a change in the base line length that is caused by change in temperature.

These conventional ranging devices, however, have problems as follows.

In the ranging device of Patent Literature 1, the optical path changing means is provided outside the ranging module 21 including the two light receiving lenses 22B, 22R and the two light sensors 23B, 23R. Accordingly, light, of which optical paths have been changed by the optical path changing means, is condensed by the light receiving lenses 22B, 22R. This raises a problem in that size of the ranging device including overall optical systems is consequently increased.

In the ranging device of Patent Literature 2, an optical system has a combination of the lens array member 26 and the mirror array member 28, and only one lens surface of each lens has a condensing effect (curved surface). Therefore, a sufficient condensing effect cannot be expected relative to the lens diameter (lens size) of the ranging lenses 26a, 26b and there is a fear that ranging precision may be decreased by insufficient quantity of light. In addition, a problem is caused in that the large focal length of the optical system will increase the size of the ranging device.

Besides, the provision of the mirror array member 28 and the intermediate mirror member 29 as reflectors involves difficulty in adjustment of positions thereof. There are different media, i.e., plastics material and air between reflection surfaces 28c, 28d of the reflection members 28a, 28b of the mirror array member 28 and reflection surfaces 29a, 29b of the intermediate mirror member 29. Thus a problem is caused in that wrong adjustment of the positions may cause optical faults, such as attenuation, refraction and surface reflection, on interfaces between the plastics material and the air.

CITATION LIST

Patent Literature

PTL1: JP H07-98205 A
PTL2: JP 2011-145115 A

SUMMARY OF INVENTION

Technical Problem

An object of the invention is to provide a small optical ranging device capable of detecting a long distance with high precision and electronic equipment installed with the same.

Solution to Problem

An optical ranging device according to one aspect of the present invention comprises:

a light emitting element;

a light receiving element for detecting a position of a light spot that is formed by light emitted from the light emitting element and reflected by an object for measurement;

a signal processing unit for processing a signal outputted from the light receiving element, a light emitting side primary molded part in which the light emitting element is sealed with a light permeable resin;

a secondary molded part in which the light emitting side primary molded part, the light receiving element, and the signal processing unit are integrally sealed with a light shielding resin;

a light emitting lens for projecting the light, emitted from the light emitting element, toward the object for measurement;

a light receiving lens for condensing the light reflected by the object for measurement;

a light shielding wall for providing optical isolation between a light emitting side optical system including the light emitting lens and a light receiving side optical system including the light receiving lens; and a first reflection surface and a second reflection surface that are placed between the light receiving lens and the light receiving element, that change a direction of an optical axis of a light beam condensed by the light receiving lens, and that guide the light beam to the light receiving element, with a single medium existing between the first reflection surface and the second reflection surface.

According to the above configuration, the direction of the optical axis of the light beam condensed by the light receiving lens is changed and the light beam is made to reach the light receiving element by the first reflection surface and the second reflection surface that are placed between the light receiving lens for condensing the light reflected by the object for measurement and the light receiving element for detecting the position of the light spot of the condensed light. Therefore, a large focal length and a large base line length can be ensured. In addition, miniaturization can be attained in comparison with the conventional configuration in which an optical path changing means is provided outside a ranging module including light emitting and light receiving elements and light emitting and light receiving lenses.

As a result, the optical ranging device capable of detecting a long distance with high precision can be configured so as to have a small size.

Furthermore, a single medium exists between the first reflection surface and the second reflection surface. This prevents faults such as attenuation, refraction, and/or surface reflection of light that might occur on interfaces between different media if these different media exist between the reflection surfaces.

In one embodiment, the first reflection surface changes the direction of the optical axis of the light beam condensed by the light receiving lens, toward a side of the light emitting lens, and the second reflection surface changes the direction of the optical axis of the light beam from the first reflection surface, toward the light receiving element.

According to the embodiment, the first reflection surface changes the direction of the optical axis of the light beam condensed by the light receiving lens, toward the side of the light emitting lens. Accordingly, the direction of the optical axis is changed with use of a region, or space, under the light receiving lens, so that the optical ranging device can further be reduced in size.

In one embodiment, the optical ranging device further comprises a reflector. And, the second reflection surface forms a surface of the reflector, and the reflector is integrally formed with the light receiving lens.

According to the embodiment, the reflector having the second reflection surface is integrally formed with the light receiving lens. This makes it possible to inexpensively form the optical ranging device of the invention without necessity of special additional members or additional steps for changing the direction of the optical axis of the light beam received by the light receiving lens so that the light beam reaches the light receiving element.

In addition, because the reflector is integrally formed with the light receiving lens, it is possible to obtain a precision of positioning between the light receiving lens and the reflector that is as high as the precision of metal molds therefor. Accordingly, positional adjustment between the reflector and the light receiving element can be facilitated and the optical ranging device can be made to have a higher precision and a smaller size in comparison with the ranging device as disclosed in Patent Literature 2, which has a mirror array member and an intermediate mirror member that are separate from a lens array member and an imaging element.

In one embodiment, the optical ranging device further comprises a lens holder holding the light emitting lens and the light receiving lens, and a reflector formed integrally with the lens holder. And, the second reflection surface forms a surface of the reflector.

According to the embodiment, the reflector including the second reflection surface is integrally formed with the lens holder holding the light emitting lens and the light receiving lens. Therefore, it can be made unnecessary to provide special additional members or additional steps for changing the direction of the optical axis of the light beam received by the light receiving lens so as to make the light beam reach the light receiving element. This makes it possible to form the optical ranging device at low cost.

In addition, because the reflector is integrally formed with the lens holder, it is possible to obtain a precision of positioning between the light receiving lens and the reflector that is as high as the precision of metal molds therefor. Accordingly, positional adjustment between the reflector and the light receiving element can be facilitated and the optical ranging device can be made to have a higher precision and a smaller size in comparison with the ranging device as disclosed in Patent Literature 2, which has a mirror array member and an intermediate mirror member that are separate from a lens array member and an imaging element.

In one embodiment, a reflector including the light shielding wall and composed of a light shielding resin is provided between the light emitting and light receiving lenses and the secondary molded part, and the first reflection surface and the second reflection surface are formed on the reflector.

According to the embodiment, the first reflection surface and the second reflection surface can be formed simultaneously with the reflector when the reflector is formed of the light shielding resin. Therefore, precision of placement of both the reflection surfaces can be heightened in comparison with a device in which the first reflection surface and the second reflection surface are separately formed and are then assembled. Consequently, the optical ranging device can be made to have a high precision.

In one embodiment, the optical ranging device further comprises a light receiving side primary molded part in which the light receiving element and the signal processing unit are sealed with a light permeable resin. And, the light emitting side primary molded part, the light receiving element, and the signal processing unit are integrally sealed with the light shielding resin in the secondary molded part by integral sealing of the light emitting side primary molded part and the light receiving side primary molded part with the light shielding resin. Also, the first reflection surface is formed integrally with the light receiving side primary molded part through medium of a substrate or a lead frame.

According to the embodiment, the first reflection surface is formed integrally with the light receiving side primary molded part through medium of the substrate or the lead frame (on which the light emitting and receiving elements are mounted), and thus the first reflection surface can be formed simultaneously with the light receiving side primary molded part. Therefore, it can be made unnecessary to provide special additional members or additional steps for changing the direction of the optical axis of the light beam received by the light receiving lens so as to make the light beam reach the light receiving element. This makes it possible to form the optical ranging device at low cost.

In one embodiment, the optical ranging device further comprises a reflector, and the first reflection surface forms a surface of the reflector. Also, the light receiving side primary molded part and the reflector are separate from each other, and a light shielding part is provided between the light receiving side primary molded part and the reflector.

According to the embodiment, the light receiving side primary molded part and the reflector are separate from each other, and the light shielding part is formed between them. Therefore, noise light that enters inside of the reflector and that is incident on the light receiving element through internal reflection can be reduced, and the optical ranging device can be made to have higher precision.

In one embodiment, the light shielding part is made of a portion of the light shielding resin that forms the secondary molded part.

According to the embodiment, the light shielding part formed between the light receiving side primary molded part and the reflector is formed of the portion of the light shielding resin that forms the secondary molded part. Thus the optical ranging device can inexpensively be formed without necessity of additional members for formation of the light shielding part.

In addition, the light shielding part can be formed without gaps between the light receiving side primary molded part and the reflector, so that noise light having entered the reflector can effectively be prevented from being incident on the light receiving element.

Electronic equipment according to another aspect of the invention is installed with any one of the above-mentioned optical ranging devices.

According to the above configuration, the installation of the small optical ranging device capable of detecting a long distance with high precision brings about elevation in function level of the electronic equipment, such as personal computers and sanitary equipment in which off control is carried out with detection of distance to a human, projectors in which focus is controlled with detection of a distance to a screen, self-propelled robots in which collision is prevented with detection of a distance to a wall, and noncontact switches in which control is carried out with detection of a distance to a human hand.

Advantageous Effects of Invention

As is apparent from above, in the optical ranging device of the invention, because the first reflection surface and the second reflection surface are placed between the light receiving lens for condensing the light reflected by the object for measurement and the light receiving element for detecting the position of the light spot of the condensed light, the direction of the optical axis of the light beam condensed by the light receiving lens is changed by the first reflection surface and the second reflection surface so that the light beam is made to reach the light receiving element. Therefore, a large focal length and a large base line length can be ensured. In addition, miniaturization can be attained in comparison with the conventional configuration in which an optical path changing means is provided outside a ranging module including light emitting and light receiving elements and light emitting and light receiving lenses. To be short, according to the present invention, an optical ranging device capable of detecting a long distance with high precision can be configured so as to have a small size.

Furthermore, the optical ranging device is configured such that a single medium exists between the first reflection surface and the second reflection surface. This prevents faults such as attenuation, refraction, and/or surface reflection of light that might occur on interfaces between different media if these different media exist between the reflection surfaces. As a result, a highly precise detection of a long distance is attainable.

Because the electronic equipment of the invention is installed with a small optical ranging device capable of detecting a long distance with high precision, it is possible to bring about elevation in function level of the electronic equipment, such as personal computers and sanitary equipment in which off control is carried out with detection of distance to a human, projectors in which focus is controlled with detection of a distance to a screen, self-propelled robots in which collision is prevented with detection of a distance to a wall, and noncontact switches in which control is carried out with detection of a distance to a human hand.

BRIEF DESCRIPTION OF DRAWINGS

The present invention will become more fully understood from the detailed description given hereinbelow and the accompanying drawings which are given by way of illustration only, and thus are not intended to limit the present invention, and wherein.

DESCRIPTION OF EMBODIMENTS

Figure 1:
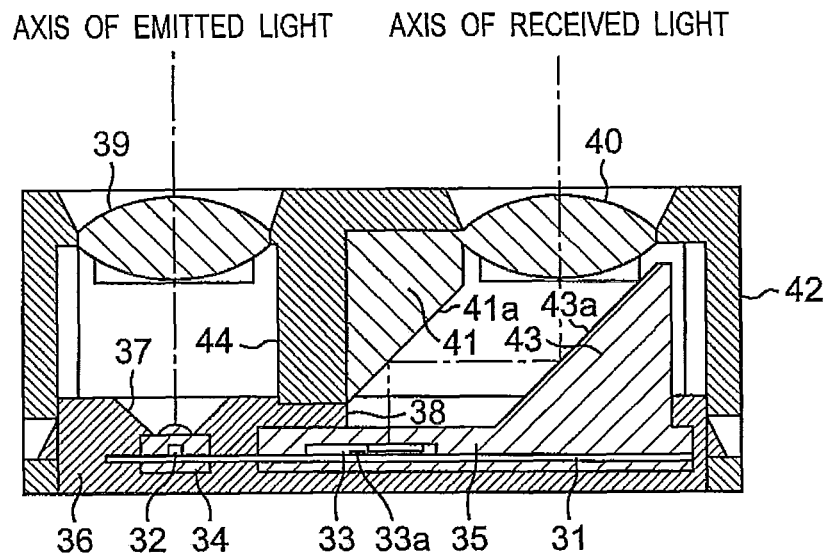
FIG. 1 is a longitudinal section of an optical ranging device of a first embodiment of the invention.

Hereinbelow, the invention will be described in detail with reference to embodiments shown in the drawings.

First Embodiment

FIG. 1 is a longitudinal section of an optical ranging device in accordance with a first embodiment.

As shown in FIG. 1, a light emitting element 32 and a light receiving element 33 are mounted on a lead frame 31. The light emitting element 32 and the light receiving element 33 are individually sealed with a light permeable resin so that a light emitting side primary molded part 34 and a light receiving side primary molded part 35 are formed. The light receiving element 33 is formed as one chip that has a built-in signal processing unit 33a capable of detecting a position of a spot of received light and outputting positional information and that.

Both the primary molded parts 34 and 35 are sealed with light shielding resin so that a secondary molded part 36 is formed. The secondary molded part 36 (light shielding resin body) is formed with windows 37, 38 are formed in specified positions above the light emitting element 32 and the light receiving element 33. A lens holder 42 provided with a light emitting lens 39, a light receiving lens 40, and a second reflector 41 having a surface sloped at about 45 degrees relative to a light receiving surface of the light receiving element 33 is engaged with the secondary molded part 36 so as to a cover top of the secondary molded part 36.

A first reflector 43 having a surface sloped at about 45 degrees relative to an axis of received light of the light receiving lens 40 is provided on a surface of the light receiving side primary molded part 35 which surface is on a side opposite to the light emitting element 32 with respect to the light receiving element 33. The first reflector 43 protrudes toward the light receiving lens 40 from the window 38 of the secondary molded part 36. Hereinbelow, the light receiving side primary molded part 35 will be also referred to as a "light receiving side primary molded part 35 with the first reflector".

Once the lens holder 42 is engaged with the secondary molded part 36, the light emitting lens 39 is placed so as to have an axis of emitted light in common with the light emitting element 33 across the window 37 of the secondary molded part 36. The light receiving lens 40 is placed so as to face a reflection surface 43a (surface included in the sloped surface) of the first reflector 43 that protrudes from the window 38 of the secondary molded part 36. The second reflector 41 is placed so that a reflection surface 41a (surface included in the sloped surface) thereof faces the reflection surface 43a of the first reflector 43 and faces the light receiving surface of the light receiving element 33 through the window 38.

A light shielding wall 44 for optical isolation between a space under the light emitting lens 39 and a space under the light receiving lens 40 is formed in the lens holder 42 and cooperates with the light shielding resin of the secondary molded part 36 to prevent a light beam emitted from the light emitting element 32 from directly intruding into the light receiving side.

In the optical ranging device having the above configuration, the light beam emitted from the light emitting element 32 is made into a generally parallel light beam by the light emitting lens 39 and is then emitted toward an object for measurement (not shown). The light reflected by the object for measurement is condensed by the light receiving lens 40, and the direction of the axis of received light is changed by the reflection surfaces facing each other, which are the surface of the first reflector 43 sloped at about 45 degrees relative to the axis of received light of the light receiving lens 40 and the surface of the second reflector 41 sloped at about 45 degrees relative to the light receiving surface of the light receiving element 33. An optical path incident on the light receiving element 33 is thereby formed.

The axis of received light is thus angled by the first reflector 43 placed under the light receiving lens 40 and by the second reflector 41 placed over the light receiving element 33, and a large focal length can consequently be ensured with effective use of the space under the light receiving lens 40. On assumption that the distance between the light emitting element 32 and the light receiving element 33 is as long as in a conventional optical ranging device, an increased base line length that is a distance between the light emitting lens 39 and the light receiving lens 40 can be ensured. In addition, miniaturization can be attained in comparison with a configuration in which an optical path changing means is provided outside a ranging module including light emitting and light receiving elements and light emitting and light receiving lenses as in the ranging device of Patent Literature 1. Accordingly, a small optical ranging device capable of detecting a long distance with high precision can be provided.

As shown in FIG. 1, the first reflector 43 is formed so as to turn the axis of received light of the light receiving lens 40 to a direction of the light emitting side optical system. This allows the space under the light receiving lens 40 to be more effectively used and therefore allows the optical ranging device to be effectively reduced in size.

As shown in FIG. 1, the first reflector 43 is formed integrally with the light receiving side primary molded part 35. That is, the first reflector 43 can simultaneously be formed with primary molding that is carried out for the light receiving element 33 with use of a light permeable resin by transfer molding. In general, a light emitting element, a light receiving element and other parts mounted on a lead frame are sealed with a light permeable resin such as epoxy resin so as to be formed into a primary molded body. The first reflector 43 is simultaneously and integrally formed with the primary molded body in the transfer molding so as to adjoin the light receiving element 33. Thus, the optical ranging device can inexpensively be formed without necessity of special additional members or additional steps for formation of the first reflector 43.

As shown in FIG. 1, the second reflector 41 is simultaneously and integrally formed with the light receiving lens 40 composed of a light permeable resin when the light receiving lens 40 is formed by injection molding. The light emitting lens 39, the light receiving lens 40, and the second reflector 41 are formed by injection molding with use of light permeable resin such as acrylic resin, polycarbonate resin, etc. and those moldings are subsequently integrated into the lens holder 42 by coinjection molding with use of light shielding resin such as ABS (acrylonitrile butadiene styrene copolymer) resin, PPS (poly phenylene sulfide) resin, etc. Such integral formation of the second reflector 41 with the light receiving lens 40 makes it possible to inexpensively form the optical ranging device of the invention without necessity of special additional members or additional steps for formation of the second reflector 41.

In addition, the formation of the first reflector 43 in the light receiving side primary molded part 35 and the integral formation of the second reflector 41 with the light receiving lens 40 make it possible to set a precision of positioning between the light receiving element 33 and the first reflector 43 and a precision of positioning between the light receiving lens 40 and the second reflector 41 as high as a precision of metal molds. Accordingly, for instance, positioning, or alignment, between the light receiving lens 40 and the first reflector 43 necessarily results in positioning between the first reflector 43 and the second reflector 41 and positioning between the second reflector 41 and the light receiving element 33. As a result, positional adjustment between the light receiving lens 40 and the first reflector 43 and between the second reflector 41 and the light receiving element 33 can be facilitated and the optical ranging device can be made to have a higher precision and a smaller size in comparison with a device in which a mirror array member and an intermediate mirror member that are separate from a lens array member and an imaging element are provided as in the ranging device of Patent Literature 2.

Because there is only a single medium of air between the reflection surface 43a of the first reflector 43 and the reflection surface 41a of the second reflector 41, when the positional adjustment between the light receiving lens 40 and the first reflector 43 and between the second reflector 41 and the light receiving element 33 is carried out, there is no risk of faults such as attenuation, refraction, and surface reflection of light, which might occur on interfaces between different media.

Figure 2:
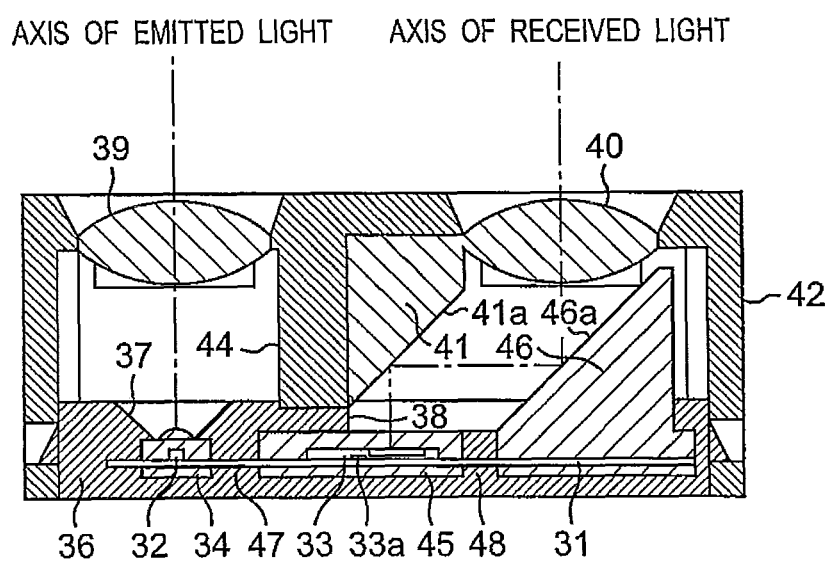
FIG. 2 is a longitudinal section of an optical ranging device of a first modification.

FIG. 2 is a longitudinal section showing an optical ranging device of a first modification of the embodiment. For the modification, only components thereof different from those in FIG. 1 will be described.

In the modification, a light receiving side primary molded part 45 in which the light receiving element 33 is sealed with the light permeable resin is separate from a first reflector 46 that has a surface (reflection surface) 46a sloped at about 45 degrees relative to the axis of received light of the light receiving lens 40 and that is composed of light permeable resin. The first reflector 46 is configured so as to contain a part of the lead frame 31. A part of the light shielding resin that forms the secondary molded part 36 lies between the light receiving side primary molded part 45 and the first reflector 46. Herein, a light shielding resin part between the light emitting side primary molded part 34 and the light receiving side primary molded part 45 is defined as a first light shielding part 47, and a light shielding resin part between the light receiving side primary molded part 45 and the first reflector 46 is defined as a second light shielding part 48.

As is the case with the optical ranging device shown in FIG. 1, preferably, the first reflector 46 is integrally formed with the light receiving side primary molded part 45 through medium of the lead frame 31 by transfer molding by which the first reflector 46 is simultaneously formed with the light receiving side primary molded part 45.

In the modification formed in such a manner, a beam of received light condensed by the light receiving lens 40 is reflected by a reflection surface 46a of the first reflector 46, while a portion of the beam enters into the first reflector 46 composed of the light permeable resin. The entering light undergoes repetitive reflection on the lead frame 31 in the first reflector 46 and side walls and a bottom surface of the first reflector 46. The light, however, is prevented from entering the light receiving side primary molded part 45 because the second light shielding part 48 formed of the light shielding resin (secondary mold) exists between the first reflector 46 and the light receiving side primary molded part 45 that seals the light receiving element 33.

Accordingly, the light having entered into the first reflector 46 can be prevented from becoming a noise light component and the optical ranging device can be made to have higher precision than the device shown in FIG. 1.

Figure 3:
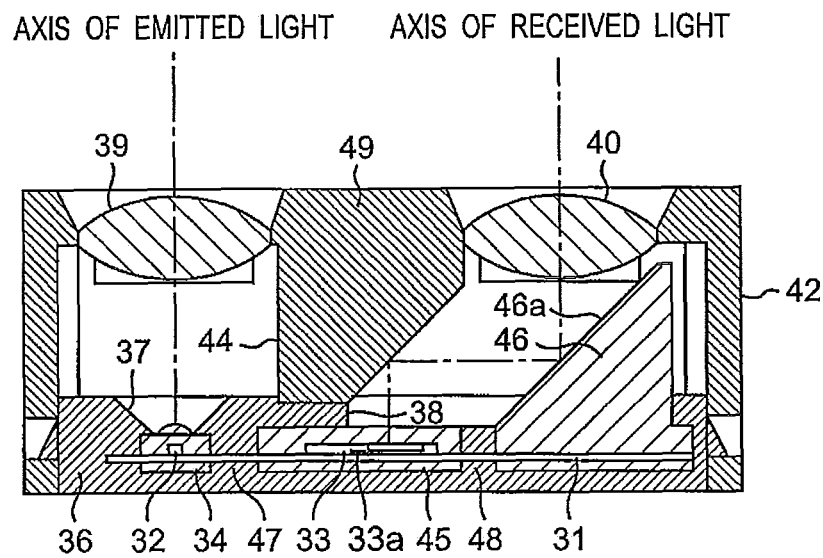
FIG. 3 is a longitudinal section of an optical ranging device of a second modification.

FIG. 3 is a longitudinal section showing an optical ranging device of a second modification of the embodiment. For the modification, only components thereof different from those of the first modification shown in FIG. 2 will be described.

In the modification, a second reflector 49 is composed of a light shielding wall that attains optical isolation between the space under the light emitting lens 39 and the space under the light receiving lens 40 in the lens holder 42. This makes it possible to carry out simultaneous formation thereof with the formation of the lens holder 42 that is attained by the coinjection molding using the light shielding resin with the integration with the light emitting lens 39 and the light receiving lens 40. Therefore, the optical ranging device can inexpensively be formed without necessity of special additional members or additional steps for formation of the second reflector 49.

In addition, the light receiving lens 40 and the second reflector 49 can be positioned at a high precision that is level with the precision of metal molds. Accordingly, the optical ranging device can be made to have high precision as in the cases of the optical ranging devices shown in FIGS. 1 and 2.

The second reflector 49 is formed of the light shielding resin and thus the beam of received light is prevented from entering the second reflector 49. Accordingly, incidence of light having entered into the second reflector 49 on the light receiving element 33 and resultant formation of a noise light component can reliably be prevented, so that the optical ranging device can be made to have a still higher precision.

For the first embodiment and the first and second modifications thereof, the light receiving element 33 has been described as one chip element that has the built-in signal processing unit 33a capable of detecting the position of the spot of received light and outputting positional information thereof. As a matter of course, the invention is not limited thereto and the light receiving element may be composed of two elements of a position detecting element (e.g., PSD, line sensor, image sensor or photodiode) for detecting the position of the spot of received light and a signal processing IC (integrated circuit) for processing signals from the position detecting element to produce and output positional information.

For the first embodiment and the first and second modifications thereof, the light emitting element 32 and the light receiving element 33 have been described as being mounted on the lead frame 31. The elements, however, may be mounted on a substrate having interconnections formed on a surface thereof.

For the following embodiment, a light receiving element will be described as one chip element with a built-in signal processing unit, and a light emitting element and the light receiving element will be described as being mounted on a lead frame. There is no problem, however, if the light receiving element is composed of two elements of a position detecting element and a signal processing IC and if the light emitting element and the light receiving element are mounted on a substrate as described above.

Second Embodiment

Figure 4:
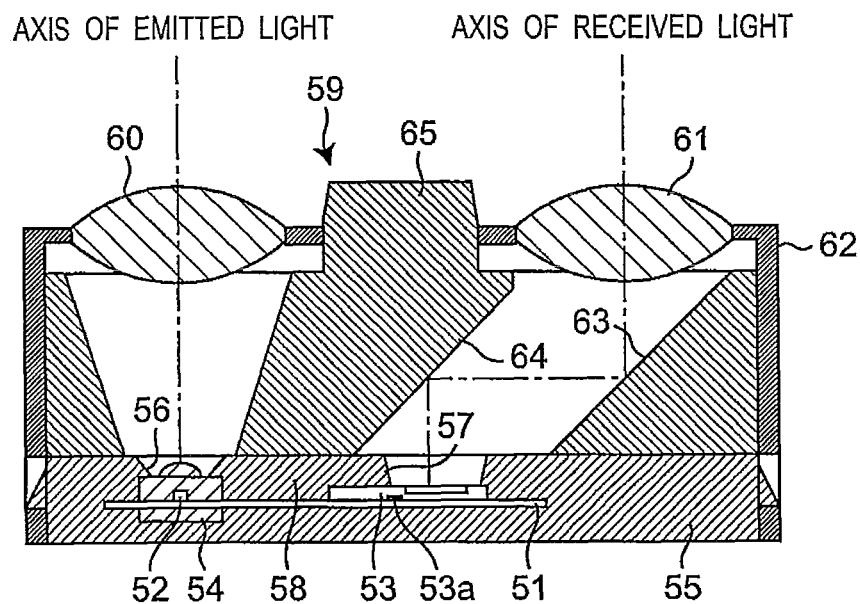
FIG. 4 is a longitudinal section of an optical ranging device of a second embodiment of the invention.
Figure 5:
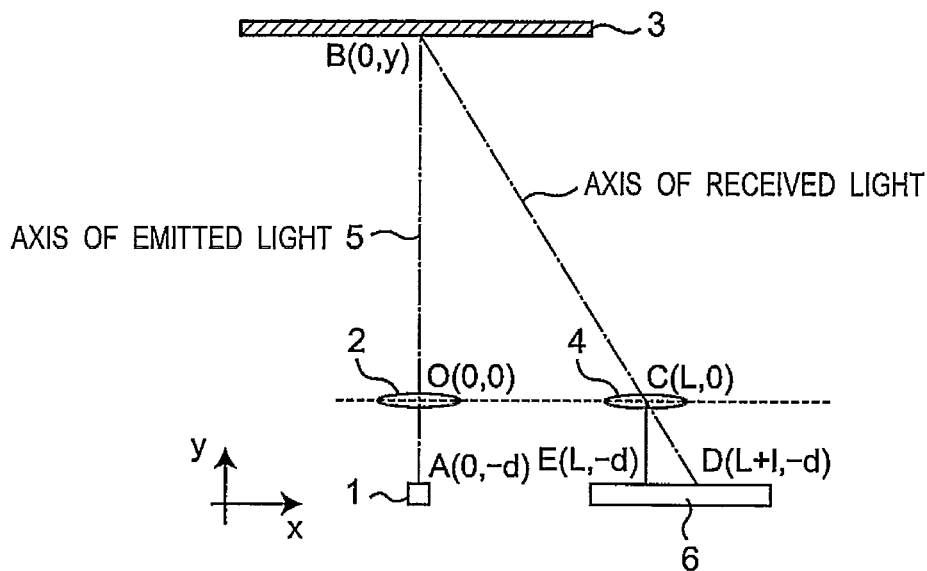
FIG. 5 is a diagram illustrating the principle of the trigonometrical ranging.
Figure 6:
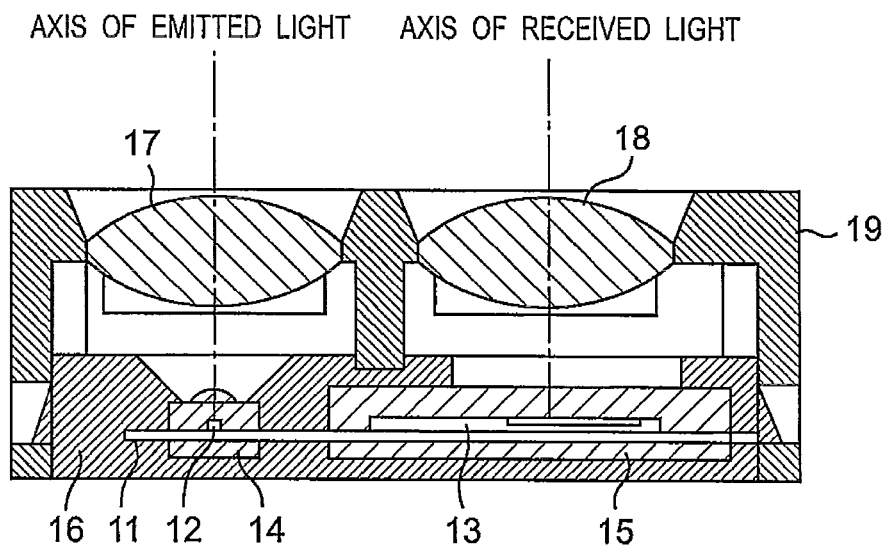
FIG. 6 is a diagram showing a schematic configuration of a conventional optical ranging device.
Figure 7:
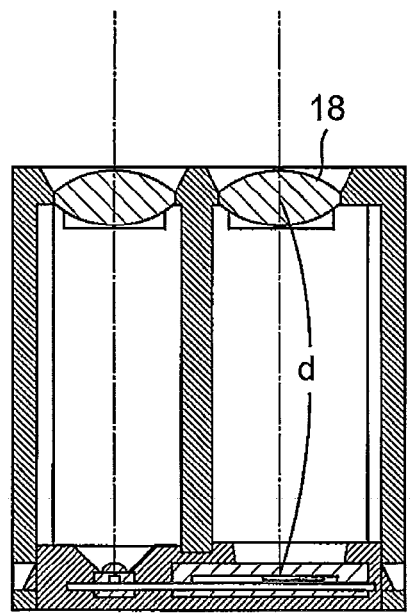
FIG. 7 is a diagram showing a modification of the optical ranging device shown in FIG. 6, which has a light receiving lens with an increased focal length.
Figure 8:
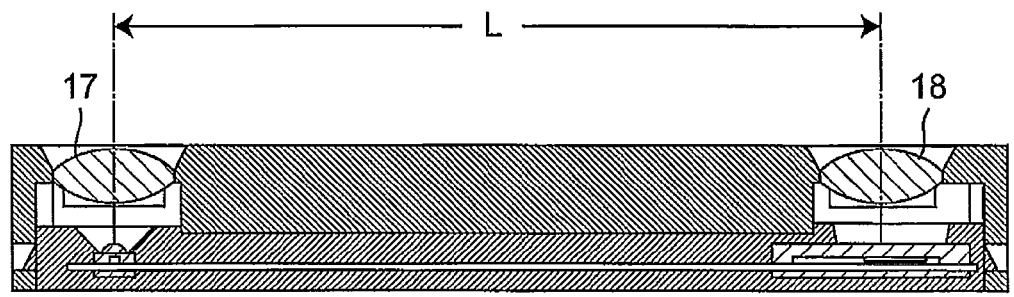
FIG. 8 is a diagram showing a modification of the optical ranging device shown in FIG. 6, which has an increased base line length.
Figure 9:
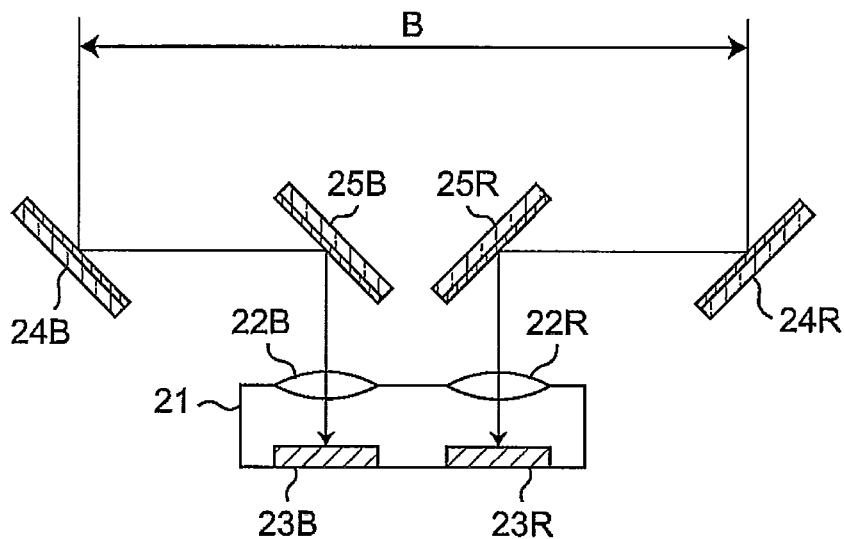
FIG. 9 is a diagram showing a ranging device of Patent Literature 1.
Figure 10:
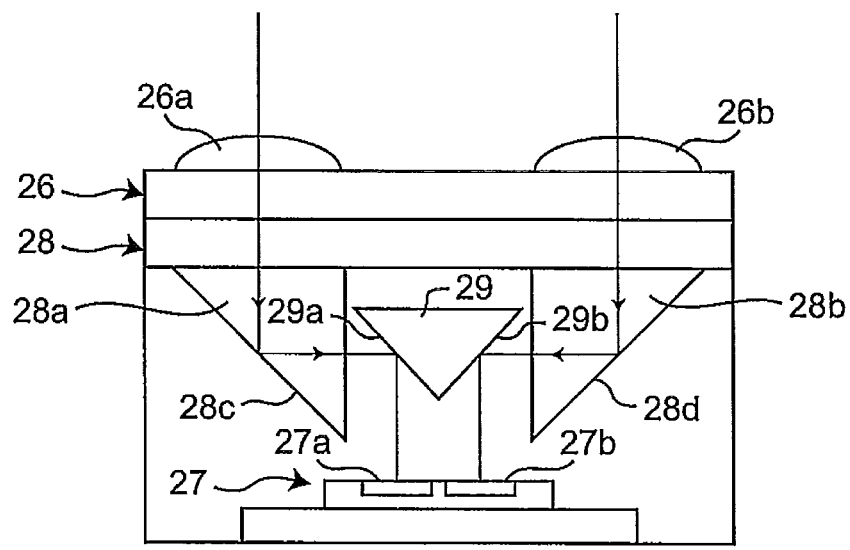
FIG. 10 is a diagram showing a ranging device of Patent Literature 2.

FIG. 4 is a longitudinal section of an optical ranging device in accordance with a second embodiment.

As shown in FIG. 4, a light emitting element 52 and a light receiving element 53 are mounted on a lead frame 51. The light emitting element 52 is sealed with light permeable resin so that a light emitting side primary molded part 54 is formed. The light receiving element 33 having a built-in signal processing unit 53a, together with the light emitting side primary molded part 54, is sealed with a light shielding resin so that a secondary molded part 55 is formed.

The secondary molded part 55 (light shielding resin body) is formed with windows 56, 57 in specified positions above the light emitting element 52 and the light receiving element 53. Light is emitted from the light emitting element 52 through the window 56. Then the light is incident through the window 57 on the light receiving element 53. Shielding between the light emitting element 52 and the light receiving element 53 is effected by a light shielding resin, which forms a light shielding part 58.

For the embodiment, the light receiving element 53 that is not subjected to primary molding with light permeable resin is disclosed. There is no problem, however, if the light receiving element 53 is subjected to the primary molding with light permeable resin as is the case with the above embodiment.

A reflector 59 is formed on the secondary molded part 55. A lens frame 62 provided with a light emitting lens 60 and a light receiving lens 61 is engaged with the secondary molded part 55 so as to cover a top of the reflector 59 and sides of the reflector 59 and the secondary molded part 55.

The reflector 59 is formed of a light shielding resin by injection molding and is provided with a first reflection surface 63 that is sloped at about 45 degrees relative to an axis of received light of the light receiving lens 61 and a second reflection surface 64 that is sloped at about 45 degrees relative to a light receiving surface of the light receiving element 53 and that faces the first reflection surface 63. The optical ranging device is formed by engagement of the molded parts with the lens frame 62 provided with the light emitting lens 60 and the light receiving lens 61.

A light shielding wall 65 for optical isolation between a space under the light emitting lens 60 and a space under the light receiving lens 61 is formed in the reflector 59 and cooperates with the light shielding part 58 of the secondary molded part 55 to prevent a light beam emitted from the light emitting element 52 from directly intruding into the light receiving side. The second reflection surface 64 is formed on a side surface of the light shielding wall 65 on the light receiving side.

In the optical ranging device having the above configuration, the light beam emitted from the light emitting element 52 is made into a generally parallel light beam by the light emitting lens 60 and is then emitted toward an object for measurement (not shown). The light reflected by the object for measurement is condensed by the light receiving lens 61, and the direction of the axis of received light is changed by the first reflection surface 63 that is sloped at about 45 degrees relative to the axis of received light of the light receiving lens 61 and the second reflection surface 64 that is sloped at about 45 degrees relative to the light receiving surface of the light receiving element 53. An optical path incident on the light receiving element 53 is thereby formed.

The axis of received light is thus angled by the first reflection surface 63 placed under the light receiving lens 61 and by the second reflection surface 64 placed over the light receiving element 53, and a large focal length can consequently be ensured with effective use of the space under the light receiving lens 61. On assumption that distance between the light emitting element 52 and the light receiving element 53 is as long as in a conventional optical ranging device, the base line length that is a distance between the light emitting lens 60 and the light receiving lens 61 can be set at a larger value. In addition, miniaturization can be attained in comparison with a device in which an optical path changing means is provided outside a ranging module including light emitting and light receiving elements and light emitting and light receiving lenses as in the ranging device of Patent Literature 1. Accordingly, a small optical ranging device capable of detecting a long distance with high precision can be provided.

The first reflection surface 63 and the second reflection surface 64 form integral components formed simultaneously with the reflector 59, as shown in FIG. 4, and thus the precision of positioning between the reflection surfaces 63 and 64 can be made very high. Accordingly, for instance, positioning, or alignment, between the light receiving lens 61 and the first reflection surface 63 necessarily results in positioning between the first reflection surface 63 and the second reflection surface 64 and positioning between the second reflection surface 64 and the light receiving element 53. As a result, the optical ranging device can be made to have still higher precision.

There is only a single medium of air between the first reflection surface 63 and the second reflection surface 64, and thus there is no risk of faults such as attenuation, refraction, and surface reflection of light that might occur on interfaces between different media.

By being installed in such electronic equipment as will be described below, the optical ranging devices of the first and second embodiments can be used as sensors, noncontact switches, noncontact controllers and/or the like that contribute to elevation in function level of the electronic equipment.

For instance, the device installed in a monitor frame part of a notebook computer is capable of detecting presence or absence of a human in front of the computer with high precision so that a power source of the monitor can automatically be turned off in the absence of human. Thus power saving for the computer can finely be attained.

The device installed in sanitary equipment such as a toilet seat of Western style makes it possible to detect presence or absence of a human to control flushing in the toilet basin and/or operations of the sanitary equipment with high precision.

The devices installed in projectors of various types (installation type, portable type and the like) make it possible to precisely detect a distance to a screen such as a wall to perform precise focus control.

The devices installed in self-propelled robots of various types, typified by a robot cleaner, can be used as sensors for preventing collision. The devices installed in doors, walls of rooms and/or the like can be used as noncontact switches for detecting a distance to a hand for opening and closure of a door, illumination of the rooms or the like. The devices installed in electrical appliances for cooking, air conditioners, or the like can be used as noncontact controllers for detecting a distance to a hand and thereby controlling the electrical appliances for cooking, the air conditioners, or the like.

Embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

REFERENCE SIGNS LIST 31, 51 lead frame
32, 52 light emitting element
33, 53 light receiving element
33a, 53a signal processing unit
34, 54 light emitting side primary molded part
35 light receiving side primary molded part with a first reflector
36, 55 secondary molded part
37, 38, 56, 57 window
39, 60 light emitting lens
40, 61 light receiving lens
41, 49 second reflector
42 lens holder
43, 46 first reflector
44, 65 light shielding wall
45 light receiving side primary molded part
47 first light shielding part
48 second light shielding part
58 light shielding part
59 reflector
62 lens frame
63 first reflection surface
64 second-reflection surface

The invention claimed is:

1. An optical ranging device comprising:
a light emitting element;
a light receiving element for detecting a position of a light spot that is formed by light emitted from the light emitting element and reflected by an object for measurement;
a signal processing unit for processing a signal outputted from the light receiving element;
a light emitting side primary molded part in which the light emitting element is sealed with a light permeable resin;
a secondary molded part in which the light emitting side primary molded part, the light receiving element, and the signal processing unit are integrally sealed with a light shielding resin;
a light emitting lens for projecting the light, emitted from the light emitting element, toward the object for measurement;
a light receiving lens for condensing the light reflected by the object for measurement;
a light shielding wall for providing optical isolation between a light emitting side optical system including the light emitting lens and a light receiving side optical system including the light receiving lens; and
a first reflection surface and a second reflection surface that are placed in a space a part of which is defined by the light receiving lens and the light receiving element and the light shielding wall, that change a direction of an optical axis of a light beam condensed by the light receiving lens, and that guide the light beam to the light receiving element, with a single medium existing between the first reflection surface and the second reflection surface.

2. The optical ranging device as claimed in claim 1, wherein
the first reflection surface changes the direction of the optical axis of the light beam condensed by the light receiving lens, toward a side of the light emitting lens, and
the second reflection surface changes the direction of the optical axis of the light beam from the first reflection surface, toward the light receiving element.

3. The optical ranging device as claimed in claim 1, further comprising a reflector, wherein
the second reflection surface forms a surface of the reflector, and
the reflector is integrally formed with the light receiving lens.

4. The optical ranging device as claimed in claim 1, further comprising:
a lens holder holding the light emitting lens and the light receiving lens; and
a reflector formed integrally with the lens holder, wherein the second reflection surface forms a surface of the reflector.

5. Electronic equipment which is installed with the optical ranging device as claimed in claim 1.

6. The optical ranging device as claimed in claim 1, wherein the single medium is air.

7. An optical ranging device comprising:
a light emitting element;
a light receiving element for detecting a position of a light spot that is formed by light emitted from the light emitting element and reflected by an object for measurement;
a signal processing unit for processing a signal outputted from the light receiving element;
a light emitting side primary molded part in which the light emitting element is sealed with a light permeable resin;
a secondary molded part in which the light emitting side primary molded part, the light receiving element, and the signal processing unit are integrally sealed with a light shielding resin;
a light emitting lens for projecting the light, emitted from the light emitting element, toward the object for measurement;
a light receiving lens for condensing the light reflected by the object for measurement;

a light shielding wall for providing optical isolation between a light emitting side optical system including the light emitting lens and a light receiving side optical system including the light receiving lens; and a first reflection surface and a second reflection surface that are placed between the light receiving lens and the light receiving element, that change a direction of an optical axis of a light beam condensed by the light receiving lens, and that guide the light beam to the light receiving element, with a single medium existing between the first reflection surface and the second reflection surface, wherein a reflector including the light shielding wall and composed of a light shielding resin is provided between the light emitting and light receiving lenses and the secondary molded part, and the first reflection surface and the second reflection surface are formed on the reflector.

8. The optical ranging device as claimed in claim 7, wherein the single medium is air.

9. Electronic equipment which is installed with the optical ranging device as claimed in claim 7.

10. An optical ranging device comprising:

a light emitting element;

a light receiving element for detecting a position of a light spot that is formed by light emitted from the light emitting element and reflected by an object for measurement;

a signal processing unit for processing a signal outputted from the light receiving element;

a light emitting side primary molded part in which the light emitting element is sealed with a light permeable resin;

a secondary molded part in which the light emitting side primary molded part, the light receiving element, and the signal processing unit are integrally sealed with a light shielding resin;

a light emitting lens for projecting the light, emitted from the light emitting element, toward the object for measurement;

a light receiving lens for condensing the light reflected by the object for measurement;

a light shielding wall for providing optical isolation between a light emitting side optical system including the light emitting lens and a light receiving side optical system including the light receiving lens;

a first reflection surface and a second reflection surface that are placed between the light receiving lens and the light receiving element, that change a direction of an optical axis of a light beam condensed by the light receiving lens, and that guide the light beam to the light receiving element, with a single medium existing between the first reflection surface and the second reflection surface; and a light receiving side primary molded part in which the light receiving element and the signal processing unit are sealed with a light permeable resin, wherein the light emitting side primary molded part, the light receiving element, and the signal processing unit are integrally sealed with the light shielding resin in the secondary molded part by integral sealing of the light emitting side primary molded part and the light receiving side primary molded part with the light shielding resin, and the first reflection surface is formed integrally with the light receiving side primary molded part through medium of a substrate or a lead frame.

11. The optical ranging device as claimed in claim 10, wherein the single medium is air.

12. Electronic equipment which is installed with the optical ranging device as claimed in claim 10.

13. The optical ranging device as claimed in claim 10, further comprising a reflector, wherein the first reflection surface forms a surface of the reflector, the light receiving side primary molded part and the reflector are separate from each other, and a light shielding part is provided between the light receiving side primary molded part and the reflector.

14. The optical ranging device as claimed in claim 13, wherein the light shielding part is made of a portion of the light shielding resin that forms the secondary molded part.

* * * * *